United States Patent [19]

Nolte et al.

[11] 4,340,518

[45] Jul. 20, 1982

[54] PROCESS FOR THE PRODUCTION OF A CATIONIC POLYCHLOROPRENE LATEX AND A MIXTURE OF THIS LATEX WITH BITUMEN EMULSION

[75] Inventors: Wilfried Nolte, Leverkusen; Heinz Esser, Burscheid, both of Fed. Rep. of Germany

[73] Assignee: Bayer Aktiengesellschaft, Leverkusen, Fed. Rep. of Germany

[21] Appl. No.: 274,819

[22] Filed: Jun. 18, 1981

Related U.S. Application Data

[63] Continuation of Ser. No. 126,534, Mar. 3, 1980, abandoned.

[30] Foreign Application Priority Data

Mar. 7, 1979 [DE] Fed. Rep. of Germany ....... 2908965

[51] Int. Cl.$^3$ .............................................. C08L 91/00
[52] U.S. Cl. ................................ 524/61; 526/213; 526/233; 524/724; 524/834; 524/706; 524/713; 524/777

[58] Field of Search .................... 260/29.7 R, 29.7 P, 260/28.5 AS, 28.5 D; 526/213, 233

[56] References Cited

U.S. PATENT DOCUMENTS 3,890,261  7/1975  Fitzgerald ..................... 260/29.7 R
4,104,272  8/1978  Pettelkau ........................ 260/27 BB

*Primary Examiner*—Melvyn I. Marquis
*Attorney, Agent, or Firm*—Connolly and Hutz

[57] ABSTRACT

Process for producing a cationic polychloroprene latex by homo- or copolymerizing chloroprene in an aqueous emulsion in the presence of ammonium salts of inorganic or organic acids as emulsifiers wherein the polymerization is carried out in presence of an alkaline earth and/or alkali salt of an organic carboxylic acid or in presence of a mixture of $Na_2HPO_4$ and $KH_2PO_4$. The latex thus obtained may be mixed with a bitumen emulsion and can be used for the protection of building or in road construction.

5 Claims, No Drawings

PROCESS FOR THE PRODUCTION OF A CATIONIC POLYCHLOROPRENE LATEX AND A MIXTURE OF THIS LATEX WITH BITUMEN EMULSION

CROSS REFERENCE TO RELATED APPLICATION

This application is a continuation of application Ser. No. 126,534 filed Mar. 3, 1980, and now abandoned.

The present invention relates to a process for the production of a cationic polychloroprene latex by polymerising chloroprene optionally with other comonomer, in the presence of an alkaline earth and/or alkali salt of an organic carboxylic acid or in the presence of $Na_2HPO_4$ and $KH_2PO_4$, and to a mixture of the latex thus produced with a cationic bitumen emulsion.

Cationic polychloroprene latices are known and are described in, for example, German Offenlegungsschrift No. 2,549,883. Such latices are produced by using quaternary ammonium salts or acid salts of a hydroxy-or hydroxymethyl-alkyl polyamine as emulsifiers in the polymerisation process.

The described latices have the following main disadvantages: latices containing quaternary ammonium salts as emulsifiers have an excessively high stability which is undesirable for numerous applications. Latices containing non-quaternary ammonium salts have too low a pH value (danger of cauterization) and, in some cases, also exhibit excessively high viscosity.

Hydrogen chloride is given off during both the production and the storage of a polychloroprene latex, with the result that the pH value thereof is reduced thereby. Acid and vesicant latices such as these are undesirable in numerous respects. In the case of latices containing non-quaternary ammonium salts as emulsifiers, the pH value cannot be increased subsequently by adding bases without special stabilisation with non-ionic emulsifiers. However, the addition of non-ionic emulsifiers results in excessive stability.

It has now been found that the unfavourable properties of cationic polychloroprene latices as discussed above can be avoided by adding an alkaline earth and/or alkali salt of an organic carboxylic acid or a mixture of $Na_2HPO_4$ and $KH_2PO_4$ in the polymerisation or copolymerisation of chloroprene, optionally with other comonomers.

Accordingly, the present invention provides a process for the production of a cationic polychloroprene latex by polymerising chloroprene, optionally with up to 50 parts by weight of a copolymerisable comonomer (based on 100 parts by weight of the total monomer) in aqueous emulsion in the presence of ammonium salts of inorganic or organic acids as emulsifiers, which is characterised in that polymerisation is carried out in the presence of an alkaline earth and/or alkali salt of an organic carboxylic acid or a mixture of $Na_2HPO_4$ and $KH_2PO_4$.

In addition to chloroprene, other monomers which are copolymerisable therewith may be added in quantities of up to 50 parts by weight and preferably in quantities of up to 10 parts by weight, based on 100 parts by weight of the total monomer. Suitable comonomers are, for example, butadiene, 2,3-dichloro-1,3-butadiene, styrene, divinyl benzene, acrylonitrile, acrylic acid esters, acrylamide, N-methylol acrylamide and ethers thereof.

The polymerisation process is carried out in known manner in aqueous emulsion at temperatures in the range of from 0° to 60° C. and preferably at temperatures in the range of from 30° to 50° C. in the presence of the usual polymerisation initiators, such as for example organic peroxides or a mixture of an organic peroxide with a reducing agent, such as cumene hydroperoxide and iron (II) chloride. The usual alkyl mercaptans may be used as molecular weight regulators.

In general, it has been found that the conversion amounts to more than 90%.

The emulsifiers normally used are salts of compounds corresponding to the formulae:

(a) $R-NH_2$ in which R is a $C_8$-$C_{25}$ alkyl or alkenyl group,

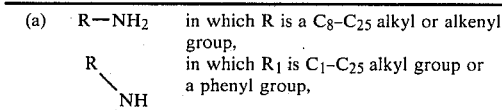 in which $R_1$ is $C_1$-$C_{25}$ alkyl group or a phenyl group, and the ethylene oxide and/or propylene oxide adducts thereof containing from 1 to 4 units;

(b) 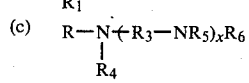 in which R and $R_1$ are as defined in (a) above;

(c) $R-N(-R_3-NR_5)_xR_6$
  |
  $R_4$ in which R is as defined in (a) above,
$R_3$ is a methylene group of the formula $(CH_2)_y$ with y equal to 1 to 4,
$R_4$, $R_5$, and $R_6$ are each H or a $C_1$-$C_4$ alkyl group provided that the total number of carbon atoms in $R_4$, $R_5$ and $R_6$ does not exceed 15, and
x = 1 to 3; and (d) 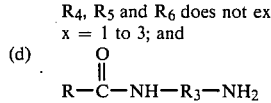

$R-C-NH-R_3-NH_2$ in which R and $R_3$ are as defined respectively in (a) and (c) above and the ethylene oxide and/or propylene oxide adducts thereof containing from 1 to 4 units, with inorganic acids or, preferably, organic carboxylic acids such as, for example, hydrogen chloride, or mono-, di-, or tri-carboxylic acids containing from 1 to 6 carbon atoms, such as formic acid, acetic acid, propionic acid, butyric acid, oxalic acid and malonic acid.

Preferred emulsifiers are the carboxylic acid salts of primary, secondary or tertiary monoamines or polyamines and also aminoamides.

It is particularly preferred, however, to use acid salts of amines corresponding to the following formula:

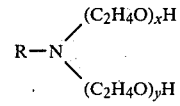

in which R is an alkyl or alkenyl group containing from 8 to 25 carbon atoms and x and y 1 to 4.

The emulsifiers may be added either before the beginning of polymerisation or, to some extent, during polymerisation if a continuous feed process is applied. The emulsifier is preferably used in a quantity of from 1 to 10% by weight and, with particular preference, in a quantity of from 2 to 5% by weight, based on the total monomer content. As already mentioned, the quantity of emulsifier used may be distributed between the initial addition and the subsequent addition, of which the initial addition may contain a smaller amount.

The feature of critical importance to the present invention is the addition of alkaline earth and/or alkali salts of an organic carboxylic acid before or during polymerisation in quantities of from 0.2 to 5 parts by weight, preferably in quantities of from 0.5 to 2.5 parts by weight, more preferably in quantities of from 0.8 to 1.8 parts by weight, based on the total monomer content. The salt may be added before polymerisation, during polymerisation, and also in a relatively small quantity before polymerisation, the balance being added to the polymerisation mixture during polymerisation by the continuous feed process.

Particularly suitable alkaline earth and/or alkali salts are the ammonium, sodium, potassium, lithium, magnesium, calcium, strontium and barium salts, more preferably the sodium, potassium or ammonium salts.

Saturated mono-, di- or tri-carboxylic acids containing from 1 to 6 carbon atoms and preferably from 2 to 4 carbon atoms may, for example, be used as the carboxylic acids on which the salts are based. Examples of carboxylic acids such as these are formic acid, acetic acid, propionic acid, butyric acid, oxalic acid, malonic acid and citric acid.

The mixing ratio of $Na_2HPO_4$ and $KH_2PO_4$ when these compounds are employed is preferably from 1:5 to 5:1 and is more preferably from 1:2 to 2:1 parts by weight. This mixture is added preferably in quantities of from 0.5 to 2.0 parts by weight, based on the total monomer content.

Because of its good properties, the cationic polychloroprene latex produced in accordance with the process of the present invention is suitable for use as an adhesion promoter in the production of synthetic fibres coated with anionic latices, for the production of elasticised concrete and, with particular preference, for admixture with cationic bitumen emulsions.

Accordingly, the present invention also provides a mixture of a cationic polychloroprene latex produced in accordance with the process of the present invention with a cationic bitumen emulsion. Modified bitumen emulsions such as these are used in the protection of buildings and, preferably, in road construction.

In road construction, even small quantities of cationic polychloroprene latices are sufficient to improve the properties of a bitumen emulsion. For example, the interval between the softening point and the breaking point is distinctly widened, ductility is greatly improved and adhesion of the bitumen to chippings is distinctly increased. Improvements in the properties of bitumen such as these lengthen the useful life of road surfaces by a considerable extent.

Bitument emulsion used for surface treatments are generally cationic, and accordingly, the polychloroprene latex to be used for finishing also has to be cationic. In addition, the latex added has to be highly compatible with the bitumen emulsion and has to break rapidly after spraying onto stone or chippings.

Previously known cationic polychloroprene latices are inadequately endowed with the above properties. The quaternary alkyl ammonium compounds hitherto used as emulsifiers increase the stability of the treated bitumen emulsions to such as extent that the latices do not "break" adequetely on stone, and the bitumen can then be washed out of the treated road surfaces by shower of rain. In addition, in the event of delayed breaking, the treated bitumen emulsion can flow off to the sides of the road because of the camber present.

The above disadvantages can be avoided by mixing a cationic polychloroprene latex produced in accordance with the process of the present invention with bitumen emulsion, a salt of a non-quaternary amine with an organic carboxylic acid preferably being used as the emulsifier during production of the polychloroprene latex, and the resulting latex having a surface tension of from 35 to 40 dyn/cm.

The mixture of the polychloroprene latex with the bitumen emulsion may be prepared for example either by mixing the latex with the emulsion with stirring or by adding the latex to the aqueous phase during emulsification of the bitumen. Mixing temperatures of up to 95° C. may be used. From 1.0 to 10.0 parts by weight and preferably from 2.0 to 5.0 parts by weight of the polychloroprene latex are used per 100 parts by weight of the bitumen emulsion.

Cationic bitumen emulsions which may be modified with the polychloroprene latices prepared according to the process of the present invention exhibit satisfactory processibility, particularly with regard to the wetting of chippings and to "breaking" on chippings. The use of such modified emulsion results in advantageous road surfaces having only very small quantities of loose chippings, improved temperature behaviour and increased useful life. Breaking behavior is measured in accordance with DIN 1995, Section 3.28 U 28. The compatibility of the polychloroprene with the bitumen emulsion is assessed by means of the deposits occurring during mixing and after storage for 1 week. A slight unavoidable separation is not used in the assessment. The test mixture consists of 5 parts by weight of polychloroprene latex and 95 parts by weight of bitumen emulsion.

In the following Examples, unless otherwise indicated, parts represent parts by weight based on 100 parts by weight of monomer.

EXAMPLE 1

A solution of 35.0 parts of water, 0.15 part of bis-(2-hydroxyethyl)-oleyl amine, 0.15 part of acetic acid, 0.01 part of iron-II-chloride, 8.0 parts of chloroprene and 0.03 part of n-dodecyl mercaptan is initially introduced into a reaction vessel equipped with a stirrer, a reflux condenser, three dropping funnels and a nitrogen inlet and outlet. The atmospheric oxygen present in the vessel is displaced by nitrogen and the temperature is increased to 50° C. Additions of 92.0 parts of chloroprene and 0.28 part of n-dodecyl mercaptan; 35.0 parts of water, 2.5 parts of bis-(2-hydroxy-ethyl)-oleylamine, 0.75 part of acetic acid and 0.6 part of sodium acetate; and 10 parts of water, 0.1 part of ethoxylated nonyl phenol (10 moles of ethylene oxide per mole of nonyl phenol) and 0.1 part of cumene hydroperoxide are uniformly made over a period of 5 hours, followed by stirring for 2 hours. The chloroprene conversion amounts to 99%. The latex obtained has a solids concentration of 53%, approximately 1% of deposits, a pH-value of 4.0 and a Brookfield viscosity (spindle 2, 60 r.p.m.) of 188 cP.

EXAMPLES 2 to 5

The procedure is as set out in Example 1, except that Example 3 represents a batch in which the additions of monomer and emulsifier are omitted. The quantities used and the results obtained are summarised in Table 1.

These Examples demonstrate the effectiveness of sodium acetate. Example 1 is included in the Table

TABLE 1

| | Examples 1 to 5 | | | | |
|---|---|---|---|---|---|
| | 1 | 2 | 3 | 4 | 5 |
| Initial Addition: | | | | | |
| Water | 35.0 | 38.0 | 70.0 | 38.0 | 35.0 |
| Bis-(2-hydroxyethyl)-oleylamine | 0.15 | 0.2 | 3.45 | 0.2 | 0.15 |
| Acetic acid | 0.15 | 0.2 | 1.2 | 0.2 | 0.15 |
| Iron-II-chloride | 0.01 | 0.02 | 0.02 | 0.05 | 0.1 |
| Sodium acetate | — | — | 1.2 | — | — |
| Chloroprene | 8.0 | 8.0 | 100.0 | 12.0 | 12.0 |
| n-dodecyl mercaptan | 0.03 | 0.03 | 0.34 | 0.03 | 0.03 |
| Monomer input: | | | | | |
| Chloroprene | 92.0 | 92.0 | — | 88.0 | 88.0 |
| n-dodecyl mercaptan | 0.28 | 0.31 | — | 0.2 | 0.25 |
| Emulsifier input: | | | | | |
| Water | 35.0 | 32.0 | — | 32.0 | 37.0 |
| Bis-(2-hydroxyethyl)-oleylamine | 2.5 | 3.25 | — | 3.25 | 2.5 |
| Acetic acid | 0.75 | 1.0 | — | 1.0 | 0.75 |
| Sodium acetate | 0.6 | 1.2 | — | 1.8 | 0.3 |
| Initiator input: as in Example 1 | | | | | |
| Concentration [%] | 53.5 | 53.0 | 53.5 | 53.4 | 53.3 |
| Conversion [%] | 99 | 98 | 99 | 99 | 99 |
| Deposits [%] | 1 | 1 | 0.5 | 0.5 | 1 |
| pH-value | 4.0 | 4.1 | 4.1 | 4.5 | 3.8 |
| Brookfield viscosity (Spindle 2, 60 r.p.m.) [cP] | 188 | 130 | 148 | 68 | 310 |
| Surface tension [dyn/cm] | 50 | 43 | 47 | 37 | 51 |
| Supplementary addition of emulsifier [parts 20% solution/100 parts of latex] | 4.5 | 2.5 | 2.5 | — | 4.0 |
| Initiator input (as in Example 1) | | | | | |
| Surface tension after supplementary addition of emulsifier | 39 | 37 | 39 | — | 37 |
| Compatibility with bitumen emulsion | good | good | good | good | good |
| Breaking behaviour of treated bitumen emulsion | good | good | good | good | good |
| pH-value after storage for 2 months | 4.0 | | | | 4.6 |

EXAMPLES 6 to 9

Examples 6 and 7 illustrate the use of another two amines and Examples 8 and 9 are Comparison Examples where no sodium acetate is used. The procedure is as set out in Example 1 except for Example 9 which again represents a batch mixture.

TABLE 2

| | Examples 6 to 9 | | | |
|---|---|---|---|---|
| | 6 | 7 | 8 | 9 |
| Initial Addition: | | | | |
| Water | 38.0 | 38.0 | 38.0 | 70.0 |
| Bis-(2-hydroxyethyl)-oleylamine | — | — | 0.2 | 3.45 |
| N-alkyl trimethylene diamine derived from tall oil | 0.2 | — | — | — |
| Dodecyl amine | — | 0.2 | — | — |
| Acetic acid | 0.2 | 0.2 | 0.2 | 1.2 |
| Iron-II-chloride | 0.02 | 0.02 | 0.02 | 0.02 |
| Chloroprene | 8.0 | 8.0 | 8.0 | 100.0 |
| n-dodecyl mercaptan | 0.03 | 0.03 | 0.03 | 0.34 |
| Monomer input: | | | | |
| Chloroprene | 92.0 | 92.0 | 92.0 | — |
| n-dodecyl mercaptan | 0.31 | 0.31 | 0.3 | — |
| Emulsifier input: | | | | |
| Water | 32.0 | 32.0 | 32.0 | — |
| Bis-(2-hydroxyethyl)-oleylamine | — | — | 3.25 | — |
| N-alkyl trimethylene diamine derived from tall oil | 3.25 | — | — | — |
| Dodecyl amine | — | 3.25 | — | — |
| Acetic acid | 1. | 1.0 | 1.0 | — |
| Sodium acetate | 1.2 | 1.2 | — | — |
| Initiator input: as in Example 1 | | | | |
| Concentration | 53.3 | 53.7 | 53.8 | Reaction too violent, had to be terminated |
| Conversion | 99 | 100 | 100 | |
| Deposits | none | none | * | |
| pH-value | 4.4 | 4.5 | 3.0 | |
| Brookfield viscosity | 1975 | 450 | * | |
| Surface tension | 48 | 41 | * | |
| Supplementary addition of emulsifier | 5.0 | 0.5 | — | — |
| Surface tension after supplementary addition of emulsifier | 39 | 37 | | |
| Compatibility with bitumen emulsion | good | good | — | — |
| Breaking behaviour with bitumen emulsion | good | good | — | — |
| pH-value after storage for 2 months | | | 2.0 | |

*Values could not be determined because the latex was too viscous

TABLE 3

Examples 10 to 15

The procedure is the same as that set out in Example 1, except that sodium acetate is replaced by other salts.

| Example No. | 10 | 11 | 12 |
|---|---|---|---|
| Salt Type | Ammonium acetate | Sodium formate | Calcium acetate |
| Quantity | 1.2 | 1.2 | 1.2 |
| Concentration [%] | 53.8 | 54.1 | 54.0 |
| Conversion [%] | 99.5 | 100 | 100 |
| Deposits [%] | traces | 0.1 | traces |
| pH-value | 4.6 | 4.1 | 4.2 |
| Brookfield viscosity | 46 | 43 | 45 |
| Surface tension | 42 | 46 | 48 |
| Supplementary addition of emulsifier | 2.0 | 2.5 | 2.5 |
| Surface tension after supplementary addition of emulsifier | 37 | 37 | 38 |
| Compatibility with bitumen emulsion | good | good | good |
| Breaking behaviour | good | good | good |

| Example No. | 13 | 14 | 15 |
|---|---|---|---|
| Salt Type | Potassium propionate | Sodium Maleate | Na$_2$HPO$_4$/KH$_2$PO$_4$ |
| Quantity | 1.2 | 1.2 | 0.75/0.7 |
| Concentration [%] | 53.7 | 50.8 | 53.5 |
| Conversion [%] | 99 | 94 | 99 |
| Deposits [%] | traces | 8 | 1 |
| pH-valve | 4.2 | 4.5 | 4.0 |
| Brookfield viscosity | 76.5 | 20.5 | 27.5 |
| Surface tension | 46 | 37 | 37 |
| Supplementary addition of emulsifier | 3.0 | — | — |
| Surface tension after supplementary addition of emulsifier | 36.5 | — | — |
| Compatibility with bitumen emulsion | good | good | good |
| Breaking behaviour | good | good | good |

We claim:

1. In the process for producing a cationic polychloroprene latex by polymerizing chloroprene and from 0 to 50 parts by weight of a copolymerizable comonomer based on 100 parts by weight of total monomer, in aqueous emulsion in the presence of a carboxylic acid salt of a primary, secondary or teriary monoamine, polyamine or aminoamide as emulsifier, wherein said carboxylic acid is selected from the group consisting of mono-, di- or tricarboxylic acids containing from 1 to 6 carbon atoms, the improvement wherein the polymerization is carried out in the presence of at least one member selected from the group consisting of alkaline earth metal salts of organic carboxylic acids and alkali metal salts of organic carboxylic acids in an amount of from 0.2 to 5 parts by weight based on total monomer, wherein said organic carboxylic acids are selected from the group consisting of saturated mono-, di- or tricarboxylic acids with 1 to 6 carbon atoms or in the presence of a mixture of $Na_2HPO_4$ and $KH_2PO_4$ in a weight ratio of 1:5 to 5:1 and in an amount of from 0.5 to 2.0 parts by weight based on total monomer.

2. The process of claim 1 wherein said primary, secondary or tertiary monoamine, polyamine or aminoamide is selected from the group consisting of (a) $R-NH_2$ wherein R is $C_8-C_{25}$ alkyl or alkenyl;

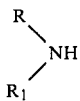  (b)

and the ethylene oxide and/or propylene oxide adducts thereof containing from 1 to 4 units wherein R is as aforesaid and $R_1$ is $C_1-C_{25}$ alkyl or phenyl;

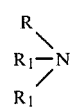  (c)

wherein R and $R_1$ are as aforesaid;

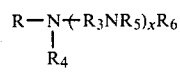  (d)

wherein R is as aforesaid, $R_3$ is of the formula $(CH_2)_y$ wherein y is 1 to 4, $R_4$, $R_5$ and $R_6$ are each hydrogen or $C_1-C_4$ with the proviso that the total number of carbon atoms in $R_4$, $R_5$ and $R_6$ does not exceed 15 and x is 1 to 3;

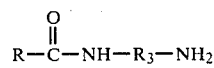  (e)

and the ethylene oxide and/or propylene oxide adducts thereof containing from 1 to 4 units wherein R and $R_3$ are as aforesaid; and

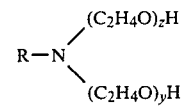  (f)

wherein R and y are as aforesaid and z is 1 to 4.

3. The process of claim 1 wherein polymerization is carried out at a temperature of from 0° to 60° C.

4. A mixture comprising 1.0 to 10.0 parts by weight of a polychloroprene latex produced by the process of claim 1 and 100 parts by weight of bitumen emulsion.

5. A mixture comprising 2.0 to 5.0 parts by weight of a polychloroprene latex produced by the process of claim 1 and 100 parts by weight of bitumen emulsion.

* * * * *